(12) United States Patent
Sorokin (10) Patent No.: US 10,870,392 B2
(45) Date of Patent: Dec. 22, 2020

(54) COMMUNICATING THE INTENTION OF A VEHICLE TO ANOTHER ROAD USER

(71) Applicant: Bayerische Motoren Werke Aktiengesellschaft, Munich (DE)

(72) Inventor: Lenja Sorokin, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/285,321

(22) Filed: Feb. 26, 2019

(65) Prior Publication Data

US 2019/0184893 A1 Jun. 20, 2019

Related U.S. Application Data

(63) Continuation of application No. PCT/EP2017/071985, filed on Sep. 1, 2017.

(30) Foreign Application Priority Data

Sep. 2, 2016 (DE) .......................... 10 2016 216 680

(51) Int. Cl.
| | |
|---|---|
| *B60Q 1/52* | (2006.01) |
| *G08G 1/0967* | (2006.01) |
| *G08G 1/16* | (2006.01) |
| *G08G 1/00* | (2006.01) |
| *B60Q 1/50* | (2006.01) |

(Continued)

(52) U.S. Cl.
CPC ............. *B60Q 1/525* (2013.01); *B60Q 1/503* (2013.01); *B60Q 5/006* (2013.01); *G08G 1/096791* (2013.01); *G08G 1/163* (2013.01); *G08G 1/166* (2013.01); *G08G 1/22* (2013.01); *G05D 1/021* (2013.01); *G05D 2201/0213* (2013.01)

(58) Field of Classification Search
CPC ........ B60Q 1/503; B60Q 1/525; B60Q 5/006; G08G 1/096791; G08G 1/163; G08G 1/166; G08G 1/22
See application file for complete search history.

(56) References Cited

U.S. PATENT DOCUMENTS

| | | | | |
|---|---|---|---|---|
| 4,947,293 A | * | 8/1990 | Johnson | B60Q 1/32 362/485 |
| 9,953,538 B1 | * | 4/2018 | Matthiesen | B60Q 1/482 |

(Continued)

FOREIGN PATENT DOCUMENTS

| | | |
|---|---|---|
| DE | 103 25 762 A1 | 12/2004 |
| DE | 10 2011 112 577 A1 | 3/2013 |

(Continued)

OTHER PUBLICATIONS

International Search Report (PCT/ISA/210) issued in PCT Application No. PCT/EP2017/071985 dated Jan. 16, 2018 with English translation (seven pages).

(Continued)

*Primary Examiner* — Omeed Alizada
(74) *Attorney, Agent, or Firm* — Crowell & Moring LLP (57) ABSTRACT

A method communicates an intention of an automated vehicle to at least one road user. For a planned maneuver that may adversely impact the other road user, an intention in relation to the carrying out of the maneuver is associated with the planned maneuver and the intention is communicated to the other road user.

10 Claims, 6 Drawing Sheets

(51) Int. Cl.
B60Q 5/00 (2006.01)
G05D 1/02 (2020.01)

(56) References Cited

U.S. PATENT DOCUMENTS

| | | |
|---|---|---|
| 2004/0246114 A1 | 12/2004 | Hahn |
| 2011/0140919 A1* | 6/2011 | Hara ................ G08G 1/163 340/907 |
| 2013/0090806 A1 | 4/2013 | Hahne |
| 2013/0099911 A1 | 4/2013 | Mudalige et al. |
| 2014/0214260 A1 | 7/2014 | Eckert et al. |
| 2015/0220991 A1* | 8/2015 | Butts ............ G06Q 30/0265 705/14.62 |
| 2016/0179094 A1 | 6/2016 | Sorokin et al. |

FOREIGN PATENT DOCUMENTS

| | | | |
|---|---|---|---|
| DE | 10 2011 114 888 A1 | 4/2013 | |
| DE | 10 2013 216 490 A1 | 2/2015 | |
| DE | 10 2013 226 336 A1 | 6/2015 | |
| DE | 10 2014 111 023 A1 | 2/2016 | |
| DE | 102014111023 A1 * | 2/2016 | ........... G05D 1/0214 |
| DE | 10 2014 226 188 A1 | 6/2016 | |
| DE | 10 2014 226 254 A1 | 6/2016 | |
| DE | 102014226254 A1 * | 6/2016 | ........... B60Q 1/2665 |

OTHER PUBLICATIONS

German-language Written Opinion (PCT/ISA/237) issued in PCT Application No. PCT/EP2017/071985 dated Jan. 16, 2018 (six pages).

German-language Office Action issued in counterpart German Application No. 10 2016 216 680.8 dated Apr. 7, 2017 (three pages).

\* cited by examiner

COMMUNICATING THE INTENTION OF A VEHICLE TO ANOTHER ROAD USER

CROSS REFERENCE TO RELATED APPLICATIONS

This application is a continuation of PCT International Application No. PCT/EP2017/071985, filed Sep. 1, 2017, which claims priority under 35 U.S.C. § 119 from German Patent Application No. 10 2016 216 680.8, filed Sep. 2, 2016, the entire disclosures of which are herein expressly incorporated by reference.

BACKGROUND AND SUMMARY OF THE INVENTION

The invention relates to a method and a control device to communicate the intention of a vehicle to at least one other road user.

The situation is caused by the unmistakable trend toward highly and fully automated driving in road traffic wherein automated vehicles will coexist with other road users, and, in particular, other non-automated road users.

Therein, these other road users, in particular if they themselves are not sufficiently automated, are dependent on communication with the automated vehicles in order to eliminate unclear right-of-way situations, for example.

For this purpose, it is necessary that vehicles and, in particular, partially, fully or highly automated vehicles, communicate information on the maneuvers planned by you and the intention planned by you in relation to carrying out the maneuvers to the other road users. In principle, the necessity for this also exists for non-automated vehicles.

It is the object of the invention to provide a method and a corresponding control device that at least reduces the described problems.

A first aspect of the invention relates to a method to communicate the intention of an, in particular, at least partially autonomously operable vehicle to at least one other road user. In the case of this other road user, it preferably has to do with a non-automated other road user, for example a pedestrian, a bike rider or the driver of a conventional vehicle.

For a planned maneuver that can adversely impact the other road user, an intention in relation to carrying out the maneuver is associated with this planned maneuver.

In the case of the intention, it can have to do with a guideline for the design of the maneuver, which, for example, influences the trajectory and/or the temporal progression of the vehicle speed or vehicle acceleration and/or the future movement corridor as well as, in particular, the point in time of the start-up and the stop point while the maneuver comes to an end.

The calculation of the maneuver or the selection of the maneuver from a multitude of maneuvers can take place here by way of an environmental model generated by sensors and/or a backend system, by way of detecting the intentions of another road user, as well as the destination.

The selection and association of an intention for the maneuver can take place by the autonomous vehicle based on a multitude of criteria. For example, for this purpose, the traffic or right-of-way rules that are valid for the current situation are evaluated or also the other road user's own goal as well as the other road user's assumed intention.

Example: Automated vehicle A is driving along a road. Vehicle B would like to turn left out of an entranceway across the lane of the automated vehicle. The automated vehicle calculates (e.g. via a cost/benefit function) that it allows the other road user to go first although it has the right of way (since the traffic light ahead is red anyhow). The maneuver "Brake" results from this. As far as no security objections speak against it, the intention (Let in) is communicated and the maneuver is carried out.

As an alternative, at a first step, the intention can also be determined and, at a second step, the maneuver can be set depending on the intention.

The vehicle's own goal can influence the intention in different ways, for example, if, with the aid of a navigation system and a digital calendar of a vehicle passenger made available to the vehicle, it is determined that an appointment will possibly not be reached on time. In this case, for example, the intention of the vehicle can seem less altruistic than in a case, in which the journey of the vehicle is not subject to any time pressure.

Information on the possibly adversely impacted other road user can also be taken into account in the case of determining the intention. For example, the intention can be determined depending on the type of the other road user, in particular, a different intention can be selected and be assigned to the maneuver if it selectively has to do with a conventional vehicle or a pedestrian in the case of the other road user.

Furthermore, also spatial information can be taken into account in the case of determining and assigning the intention, for example, the distance to the other road user or its speed in relation to the vehicle.

The intention associated with the maneuver is then communicated to the other road user, wherein the communication can take place via one or a plurality of channels.

For example, an acoustic communication can take place where the intention is communicated by way of a speaker or a horn.

As an alternative, visual communication is also possible. For example, the intention can be communicated by a display attached to the vehicle. In particular, the displays can be attached in all windows or on a window for each surface orientation in order to be viewable 360° around the vehicle.

Another example for a communication channel is indicating the intention by means of abstract light.

Furthermore, the intention can also be communicated using a light strip. This light strip can run up to 360° around the vehicle and, for example, be attached underneath or above the windows.

Furthermore, the intention can also be communicated to the other road user by means of projection. Therein, various symbols, texts or images can be projected. In particular, projections into the planned trajectory of the vehicle and/or into the planned trajectory of the other road user are favorable.

As an alternative, the intention can also be digitally communicated, for which, for example, Car2x communication, mobile communications or cloud services can be used. For example, a digital communication is possible where the intention of the vehicle is displayed directly in a display of the other road user, for example a heads-up display or a display of an infotainment system.

A communication of the intention in digital form is also possible for pedestrians. For example, this can be transmitted to a cell phone or a smart watch of the pedestrian and displayed there.

In an advantageous embodiment, an intention represents an execution of the planned maneuver of the vehicle, wherein, in particular, the intrinsic maneuver is carried out before the maneuver of the other road user on a temporal level.

Herein, the vehicle assumes an active "egotistical" role and, for example, perceives a right of way or drives on. A corresponding intention can, in particular, be described with the key word "Drive on" ("Vehicle would like/will drive on", "Vehicle would like/will drive off", "Vehicle would like/will pass", "Vehicle would like/will drive first") and/or the key word "Let me pass".

In another advantageous embodiment, an intention represents an at least temporary interruption or delay of the planned maneuver of the vehicle.

The vehicle herein assumes a passive "altruistic" role and thus makes a movement of the other road user possible. As an example, this intention is implemented in the following situations:

Waiving the right of way to de-escalate a critical traffic situation.

Allowing another road user to merge in upon its request with or without a claim to the right of way of the other road user (with a claim to the right of way, for example, late merging in the case of a lane ending on a multi-lane road).

Allowing a pedestrian who would like to cross a crosswalk to pass.

Cancelling the maneuver and determining a new maneuver.

A corresponding intention can, in particular, be described with the key word "Let in" ("Vehicle allows the other road user to go ahead") and/or the key word "Drive on" (as a demand placed on the other road user).

In another advantageous embodiment, for the planned maneuver, a danger potential for the other road user is determined and the communication of the intention occurs depending on this danger potential.

Therein, the danger potential, for example, can be derived based on various criteria, which refer to the vehicle, the other road user, or the interaction of the vehicle with the other road user.

For example, physical parameters of the planned maneuver of the vehicle can be evaluated, such as target speed or target acceleration.

Furthermore, characteristics of the other road user, which can be detected by use of sensors, are evaluated and used to determine the danger potential. Usually, for a pedestrian, for example, more danger originates from the vehicle than for a second vehicle, in particular, for a second vehicle with a higher level of mass than the mass of the vehicle.

Furthermore, the interaction of the vehicle with the other road user can also be detected by way of sensors and be evaluated to determine the danger potential. For example, the distance of the vehicle to the other road user can be evaluated or the approach of the trajectory of the planned maneuver of the vehicle to the trajectory of the other road user.

The communication of the intention of the vehicle can be adapted depending on the determined danger potential and/or the determined right-of-way rule. For example, the color, the animation, the size and/or the light intensity of a visual message or the volume, frequency and/or the repetition frequency of an acoustic message according to the danger potential can be selected according to the danger potential.

Therein, the invention is based on the knowledge that in comparable situations in human communication, the communication can be adapted by means of an inflection without changing the contents.

Situational example "Merge 1": if the other road user is obligated to allow the automated vehicle to merge, but does not show any sign of doing this, the automated vehicle communicates the intention "Drive on" with the specification "Assert right of way" (demanding, e.g. red color, increased frequency).

Situational example "Merge 2": if the other road user is not obligated to allow the automated vehicle to merge, this automated vehicle communicates the intention "Drive on" with the specification "Request right of way".

Furthermore, the message itself and the message content can be changed.

In another advantageous embodiment, the other road user is analyzed in relation to specified criteria and the communication of the intention takes place depending on the results of this analysis.

In the case of these criteria, it can, for example, have to do with spatial criteria, such as the position of the other road user or its distance to the vehicle for example. Based on this criterion, for example, the volume of an acoustic signal can be selected, wherein the volume can increase in proportion to the distance of the other road user to the vehicle.

However, it can also be criteria that describe the state of the other road user. For example, if it has to do with another road user who is human, the line of sight of the other road user who is human is analyzed. If in the case of the other road user, it has to do with a pedestrian, for example, the intention can be communicated by means of a display attached to the vehicle or a display of the pedestrian's cell phone depending on if the line of sight of the pedestrian points toward the vehicle or his/her cell phone.

Another example for a criterion, which describes the state of another road user and, in particular, the state of a pedestrian, is his/her attentiveness. An inattentive pedestrian is informed, for example, better by means of an acoustic message concerning the intention of the vehicle than by means of a visual message.

The type of the other road user is a criterion, depending on which the communication of the intention of the vehicle can occur. Thereby, for example, a pedestrian will be capable of perceiving an acoustic signal better than the driver of a motor vehicle.

Furthermore, for example, also the environment of the other road user can be a criterion, depending on which the communication of the intention of the vehicle can take place.

In another advantageous embodiment, the response of the other road user to a communicated intention is monitored and depending on the response the intention is communicated at least one further time. Along the same lines, the medium and intensity (e.g. volume, color) are adapted depending on the response.

In particular, in the case of repeating the communication, the intention can be communicated by means of an alternative communication medium and/or with another danger potential.

If, for example, another road user does not react to the transmission of the intention "Drive on" of the vehicle, an escalation can be made in order to transmit the intention at least one further time, for example, with an increased volume or a higher light intensity.

This aspect of the invention represents an independent idea.

In another advantageous embodiment, the intention of the vehicle is projected onto the road by way of a light strip.

Therein, for example, the projection can be controlled in such a way that the light strip is visible to the other road user to the furthest extent possible.

As an alternative to projecting the light image onto the road, for example, a projection onto objects or buildings is contemplated. This can optionally lead to an increased visibility of the light image for the other road user in comparison to a projection of the light image onto the road.

In another favorable embodiment, the intention of the vehicle is displayed by use of a light strip running around the vehicle.

In another advantageous embodiment, the intention of the vehicle is displayed by use of a transparent display in the windows.

Thereby, the transparent displays can work comparably to conventional heads-up displays, wherein, in contrast to a conventional heads-up display, the image is visible for other road users. Furthermore, the transparent displays can be transparent display media such as transparent OLEDs.

A second aspect of the invention relates to a control device to communicate the intention of a vehicle to at least one other road user, wherein the control device is configured, for a planned maneuver of the vehicle that may adversely impact the other road user, in order to associate an intention in relation to carrying out the maneuver with this planned maneuver and to communicate this intention to the other road user.

The preceding designs for the method according to the invention according to the first aspect of the invention also apply in a corresponding way for the control device according to the invention according to the second aspect of the invention. Advantageous exemplary embodiments of the control device according to the invention that are not explicitly described at this point and in the patent claims correspond to the advantageous exemplary embodiments of the method according to the invention described in the above or in the patent claims.

In the following, the invention is described based on the three exemplary embodiments.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
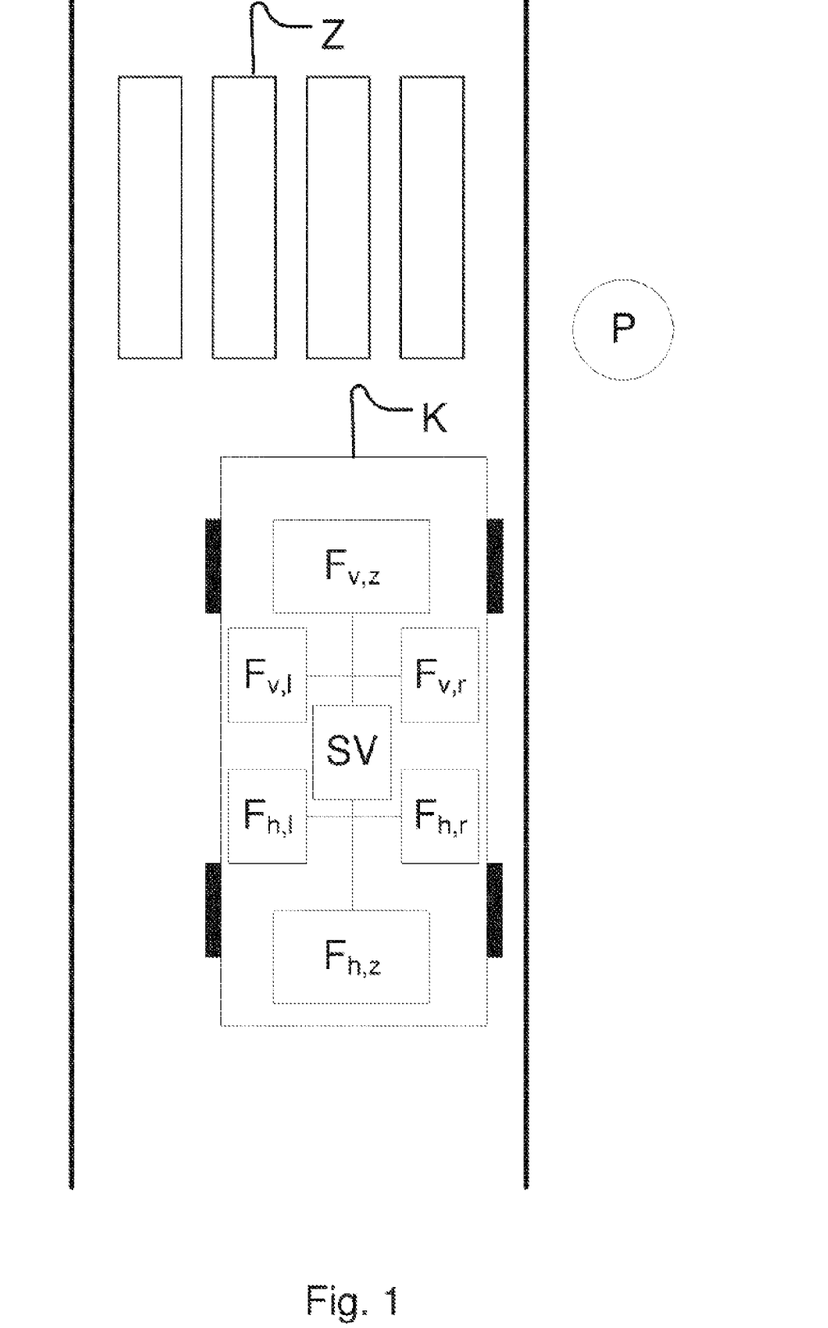
FIG. 1 illustrates a first exemplary traffic situation "Pedestrian crossing" for the use of the method according to the invention.

FIG. 1 shows a motor vehicle K in front of a pedestrian crossing Z. The automated motor vehicle K also comprises displays in the windows to show the intention in addition to a control device SV for determining and communicating the intention of the automated motor vehicle K to at least one other road user.

In particular, the automated motor vehicle K comprises a display $F_{v,z}$ in the windshield, a display $F_{v,l}$ in the left anterior side window, a display $F_{h,l}$ in the left posterior side window, a display $F_{h,z}$ in the rear window, a display $F_{h,r}$ in the right posterior side window and a display $F_{v,r}$ in the right anterior side window.

Another road user P, being a pedestrian, is located next to the street.

Figure 2:
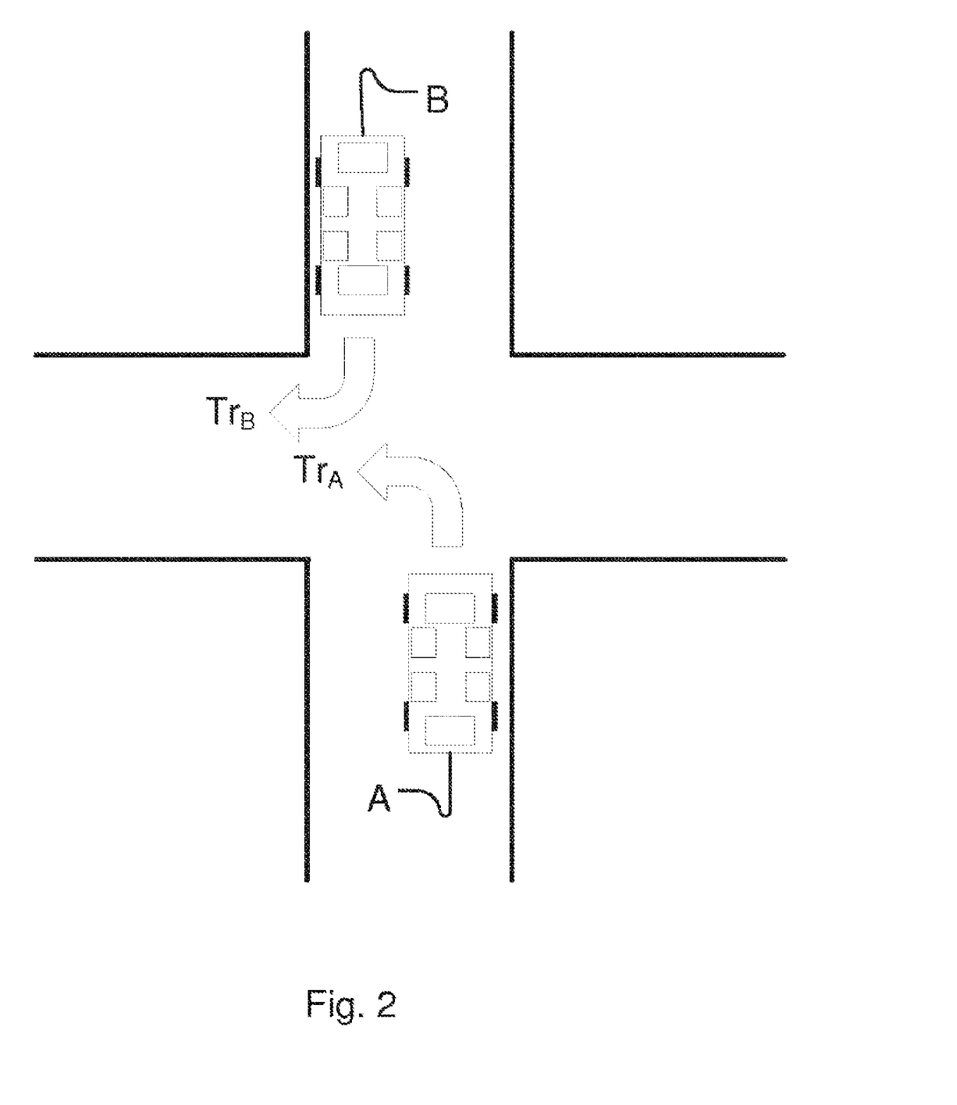
FIG. 2 illustrates a second exemplary traffic situation "Intersection" for the use of the method according to the invention.

FIG. 2 shows a road intersection. At the intersection, an automated vehicle A and another road user B meet each other, wherein in this situation the other road user B is a non-automated vehicle.

Automated vehicle A would like to turn left using maneuver $Tr_A$. This planned maneuver can, for example, be displayed by activating a driving direction indicator (turn signal).

Non-automated vehicle B would like to turn right using maneuver $Tr_B$. This planned maneuver can also be displayed by activating a driving direction indicator (turn signal). Both planned maneuvers $Tr_A$ and $Tr_B$ therefore overlap.

Figure 3:
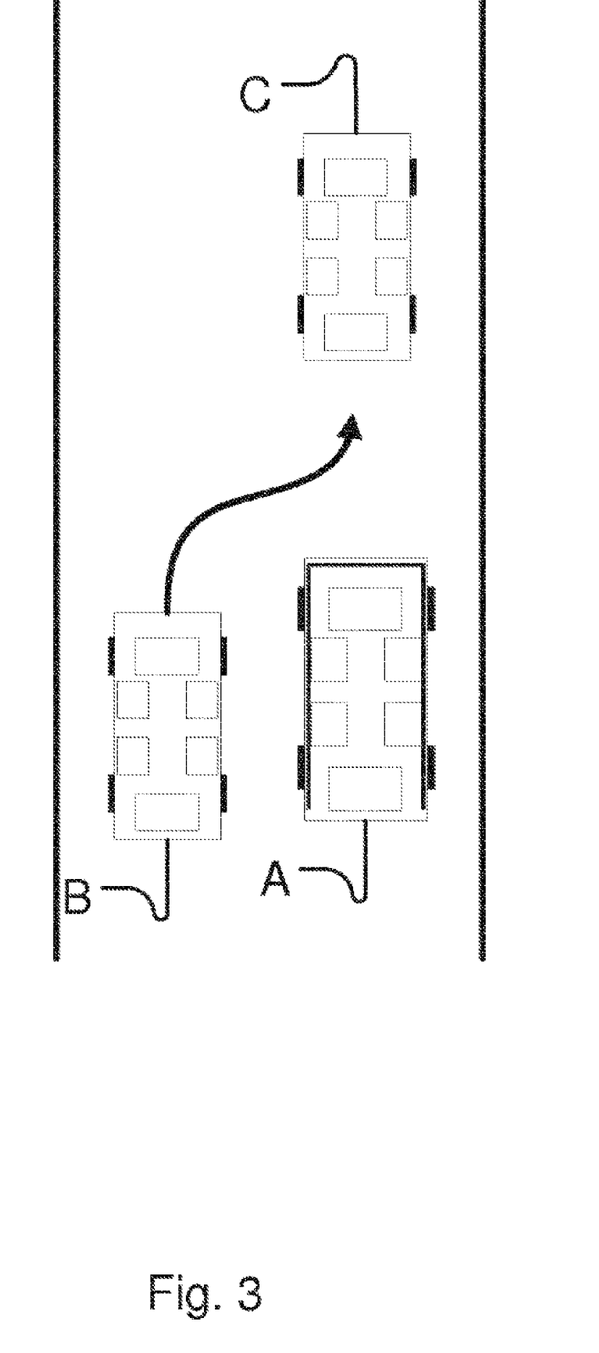
FIG. 3 illustrates a third exemplary traffic situation "Passing maneuver" for the use of the method according to the invention.

FIG. 3 shows a traffic situation where automated vehicle A follows another vehicle C. Whether vehicle C is an automated vehicle or a non-automated vehicle is not relevant to the method according to the invention.

Non-automated vehicle B would like to merge into the gap between vehicle C and automated vehicle A. For example, this traffic situation occurs when vehicle B performs a passing maneuver. However, the traffic situation is also typical for a narrowing of the road, where two lanes lead into the same direction and are merged into a single lane.

Therein, automated vehicle A is equipped with a circumferential light strip.

Figure 4:
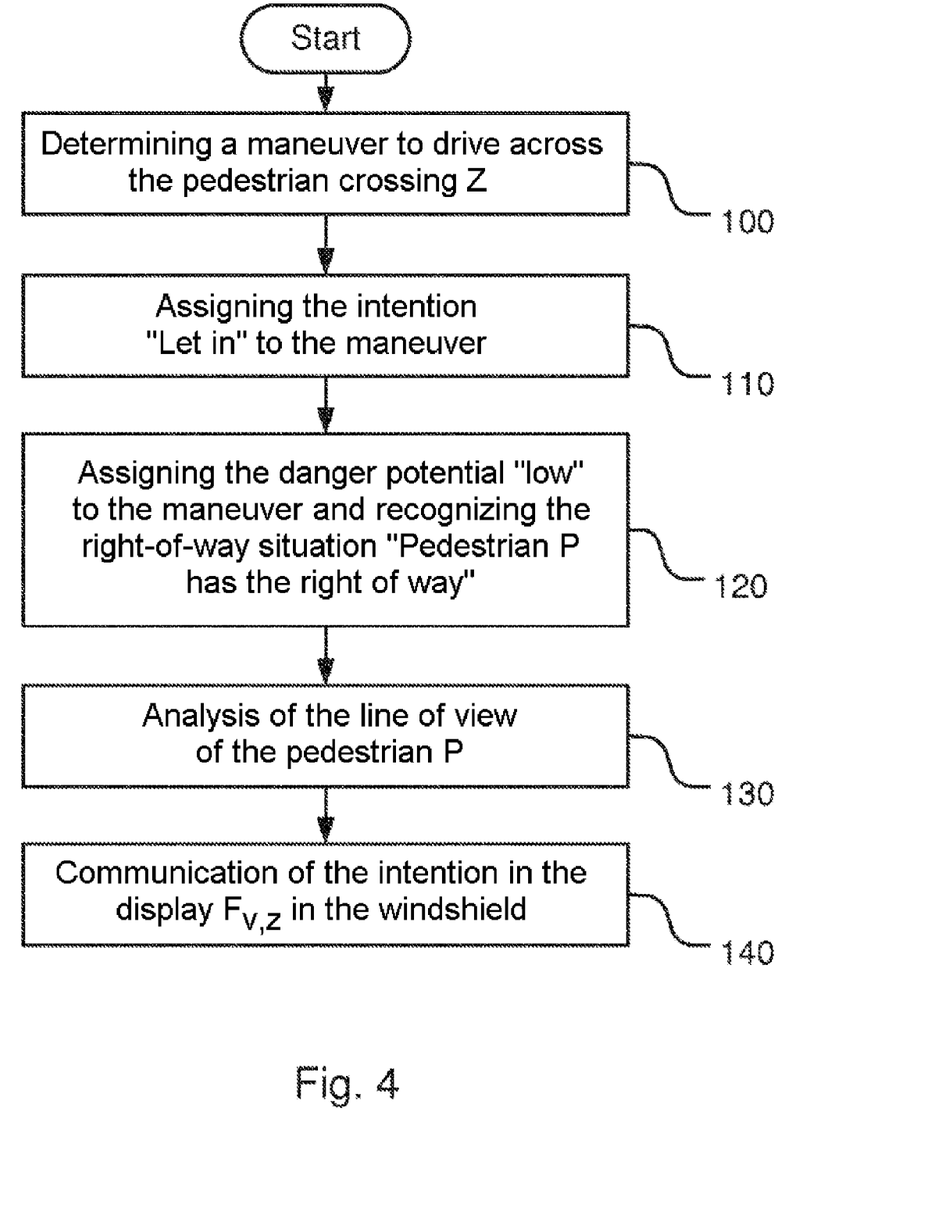
FIG. 4 is a flow chart of an exemplary embodiment of the method according to the invention in the first traffic situation.

FIG. 4 describes an exemplary embodiment of the method according to the invention in the traffic situation that is shown in FIG. 1.

At step 100, automated vehicle K determines a maneuver to drive across pedestrian crossing Z.

Since the pedestrian P wants to cross the pedestrian crossing Z, this is adversely impacted by the maneuver of the automated vehicle. This adverse impact is represented in such a way that the pedestrian P would only cross the pedestrian crossing Z with caution or, if in doubt, not at all, since for him, the intention of the automated vehicle K is not clear.

If, in the case of vehicle K being a conventional vehicle, the pedestrian P could, for example, make his/her intention known by establishing visual contact with the driver of vehicle K. However, since here vehicle K is an automated vehicle, this possibility does not exist.

Therefore, at step 110, the automated vehicle K determines the intention "Let in" for the maneuver, which brings about a temporary interruption of the driving maneuver. The basis for determining this intention is, for example, that, when crossing a pedestrian crosswalk, the pedestrian P principally enjoys the right of way ahead of motorized traffic.

Since only minimal danger to the pedestrian P originates from the automated vehicle K due to the temporary interruption of the maneuver, the danger potential "low" is assigned to the maneuver at step 120. Furthermore, the valid right-of-way situation is detected and it is determined that pedestrian P has the right of way.

In the case of an analysis of the line of sight of the pedestrian P by automated vehicle K, at step 130, it is determined that pedestrian P perceives automated vehicle K.

Therefore, at step 140, the intention "Let in" is communicated by means of the display in the front windshield. Therein, for example, the automated vehicle K can be schematically represented with a bar in front of the front end of the vehicle as a stylised stop line of the vehicle K. The low danger potential, which was determined at step 120, for example, can be displayed using a friendly color.

Figure 5:
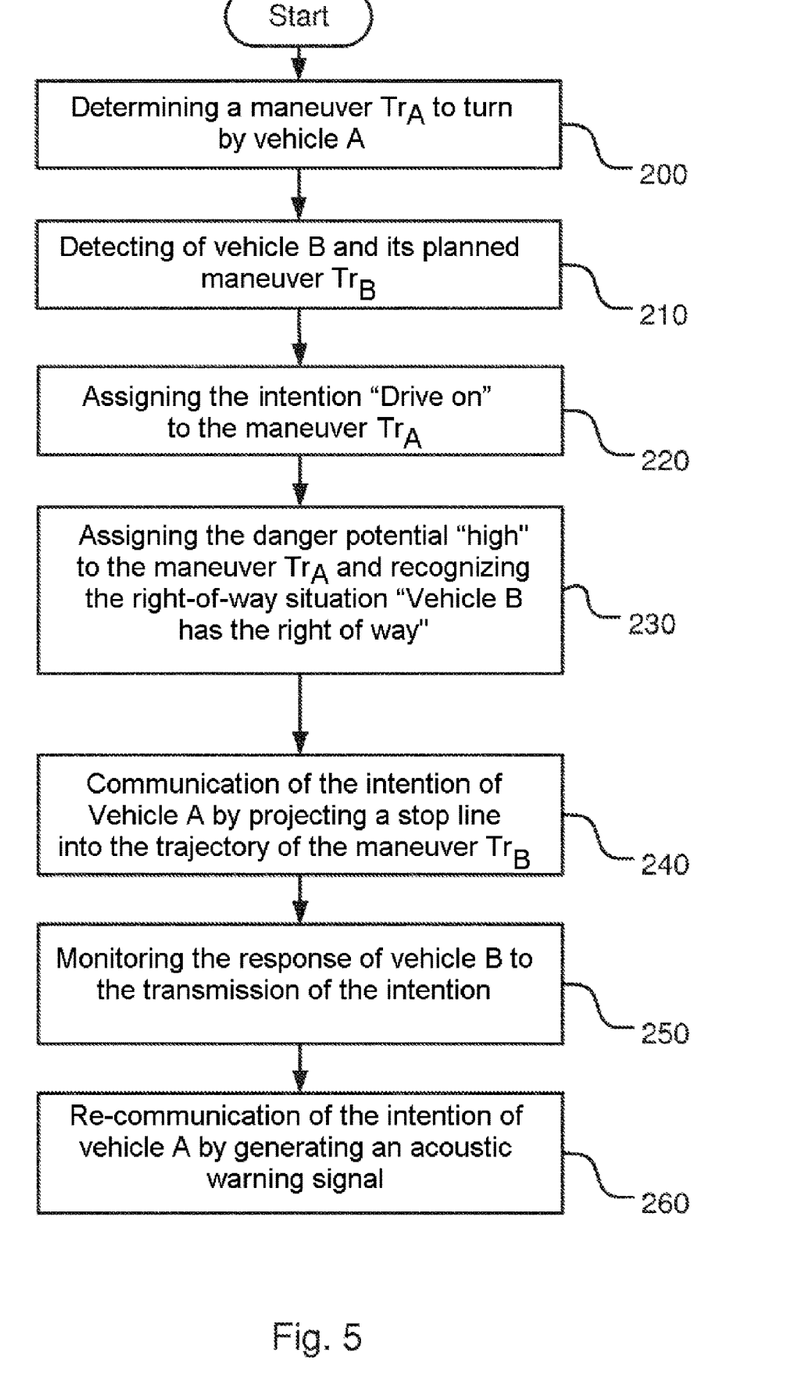
FIG. 5 is a flow chart of an exemplary embodiment of the method according to the invention in the second traffic situation.

FIG. 5 describes an exemplary embodiment of the method according to the invention in the traffic situation that is shown in FIG. 2.

At step 200, the automated vehicle A determines a maneuver $T_{rA}$ for turning.

At step 210, the vehicle B and its planned maneuver $T_{rB}$ is detected by the automated vehicle A.

Therein, the maneuver $T_{rA}$ leads to an adverse impact of the maneuver $T_{rB}$ of vehicle B, since the rule "Right before left" is used, which leads to a claim to the right of way of vehicle B.

Nevertheless, the automated vehicle A assigns the intention "drive on" to maneuver $T_{rA}$ at step 220 as a representative of the intention class, which comprises carrying out the planned maneuver. For example, this can be practical if a specific danger would arise due to an interruption of the maneuver $T_{rA}$, for example, if the automated vehicle A blocks the way for an emergency vehicle.

At step 230, the danger potential "high" is associated with the maneuver $T_{rA}$ since the automated vehicle A takes the right of way, de facto, from vehicle B due to maneuver $T_{rA}$.

At step 240, the intention "Drive on" is therefore communicated to the vehicle B by way of projecting a stop line into the trajectory of the maneuver $T_{rB}$.

The transmission of the intention "Drive on" should lead to an interruption of the maneuver $Tr_B$ of the vehicle B in order to keep a dangerous situation from occurring. Therefore, after projecting the stop line, the response of the vehicle B to the communicated intention of the automated vehicle A is monitored by the automated vehicle A at step 250.

Should the vehicle B not cancel its maneuver $T_{rB}$ as desired, at step 260, an escalation mechanism goes into force. Therein, the intention "Drive on" of automated vehicle A can be re-transmitted, however by way of another more aggressive type of communication. Therein, for example, it can have to do with an acoustic warning signal.

Figure 6:
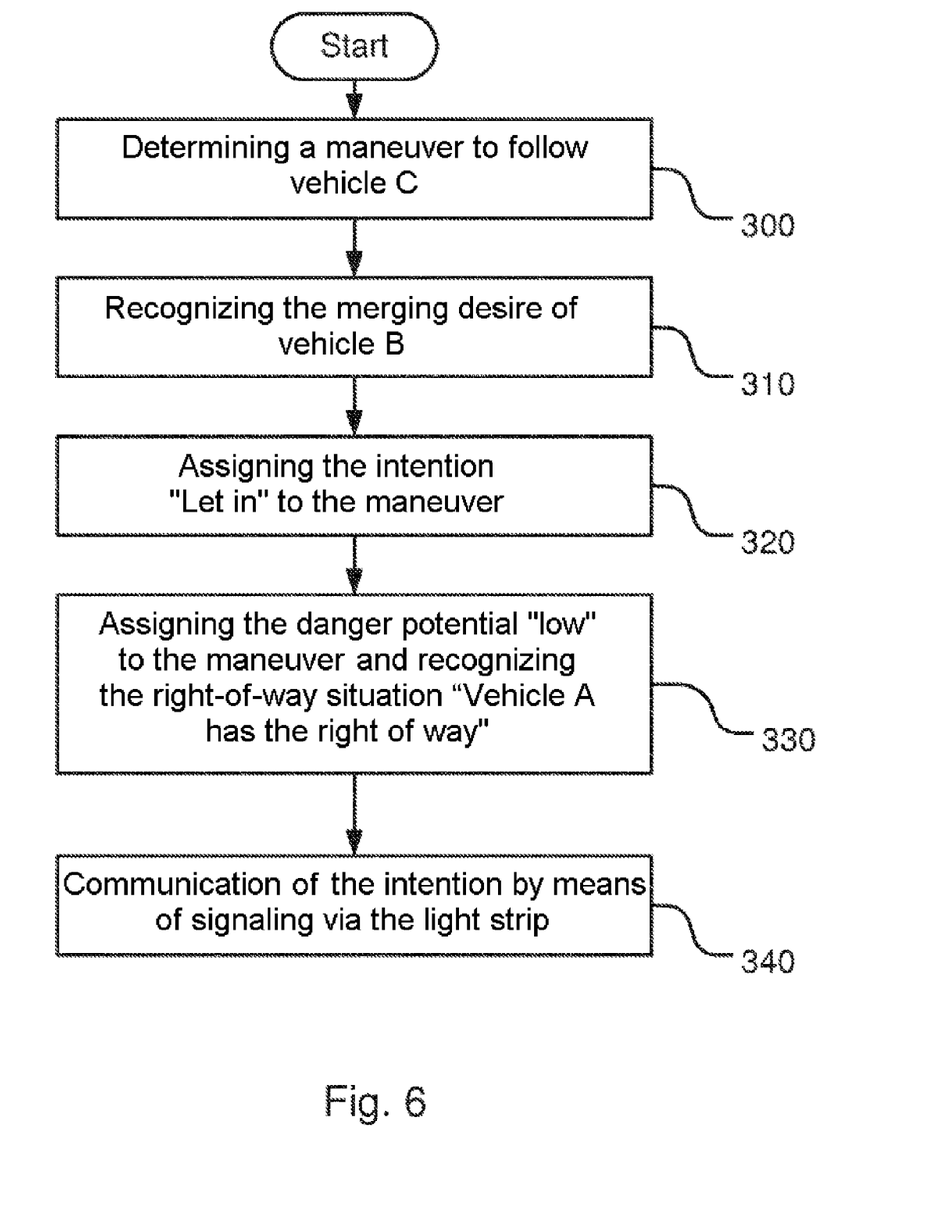
FIG. 6 is a flow chart of an exemplary embodiment of the method according to the invention in the third traffic situation.

FIG. 6 describes an exemplary embodiment of the method according to the invention in the traffic situation that is shown in FIG. 3.

At step 300, automated vehicle A determines a maneuver for the following of vehicle C. This maneuver can, for example, be designed in such a way that the automated vehicle A follows the trajectory of vehicle C at a fixed distance.

At step 310, by means of the automated vehicle A, the desire of vehicle B to merge between automated vehicle A and vehicle C is detected. This desire and the maneuver associated therewith of vehicle B conflicts with the maneuver of automated vehicle A.

Therefore, at step 320, the intention "Let in" is associated with the maneuver of automated vehicle A. Therein, since only a slight danger for vehicle B can arise, only a slight danger potential is additionally associated with the maneuver at step 330. In addition, the right-of-way situation is analyzed and it is detected that vehicle A has the right of way.

This intention is then communicated by automated vehicle A to vehicle B at step 340. For example, for this purpose, illuminating markings can be displayed on the light strip of automated vehicle A, which move along automated vehicle A in the direction of the gap between vehicles A and C.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of communicating intention of a vehicle to at least one other road user, the method comprising:
    for a planned maneuver of an automated vehicle which can adversely impact the other road user, associating with the planned maneuver an intention in relation to carrying out the planned maneuver; and
    communicating said intention to the other road users;
    wherein for the planned maneuver, a danger potential and a valid right-of-way rule for the other road user and the automated vehicle are determined;
    the communication of the intention occurs depending on the danger potential and the valid right-of-way rule; and
    wherein the intention of the automated vehicle is selectively chosen based on a type of the other road user.

2. The method as claimed in claim 1, wherein
    the intention represents an execution of the planned maneuver of the automated vehicle, wherein the execution of the planned maneuver is to be carried out on a temporal level before a maneuver of the other road user.

3. The method as claimed in claim 1, wherein
    the intention represents an interruption of the planned maneuver of the automated vehicle.

4. The method as claimed in claim 1, wherein
    the other road user is analyzed in relation to specified criteria, and
    the communication of the intention takes place depending on a result of said analysis.

5. The method as claimed in claim 1, further comprising the act of:
    monitoring a response of the other road user to a communicated intention; and
    depending on said response, the intention is communicated at least one further time if no response or a not expected response of the other road user takes place.

6. The method as claimed in claim 1, wherein
    a planned trajectory of the automated vehicle is projected onto a road via a light strip.

7. The method as claimed in claim 1, wherein
    the intention of the automated vehicle is displayed via at least one light strip running around the automated vehicle.

8. The method as claimed in claim 1, wherein
    the intention of the automated vehicle is displayed via at least one transparent display in at least one window of the automated vehicle.

9. A device to communicate an intention of an automated vehicle to at least one other road user, comprising:
    a control unit operatively configured to execute processing to:
    for a planned maneuver of the automated vehicle which can adversely impact the other road user, associate with the planned maneuver an intention in relation to carrying out the planned maneuver; and communicate said intention to the other road user;

wherein for the planned maneuver, a danger potential and a valid right-of-way rule for the other road user and the automated vehicle are determined;

the communication of the intention occurs depending on the danger potential and the valid right-of-way rule;

wherein the intention of the automated vehicle is selectively chosen based on a type of the other road user.

10. The method as claimed in claim 1, wherein the intention of the automated vehicle is transmitted to and displayed on an electronic communication device of the other road user.

\* \* \* \* \*